United States Patent
Herwitz

(10) Patent No.: US 8,370,057 B1
(45) Date of Patent: Feb. 5, 2013

(54) AUDIOVISUAL DISPLAY MODES FOR SENSE-AND-AVOID SYSTEM FOR AERIAL VEHICLES

(76) Inventor: Stanley Robert Herwitz, Newton, MA (US)

(*) Notice: Subject to any disclaimer, the term of this patent is extended or adjusted under 35 U.S.C. 154(b) by 375 days.

(21) Appl. No.: 12/661,672

(22) Filed: Mar. 22, 2010

Related U.S. Application Data

(63) Continuation-in-part of application No. 11/888,070, filed on Jul. 31, 2007, now Pat. No. 7,706,979.

(51) Int. Cl.
*G06F 17/10* (2006.01)

(52) U.S. Cl. .......... 701/301; 701/66; 701/120; 701/408; 340/903

(58) Field of Classification Search .................. 701/454, 701/301, 120, 482, 484, 487, 514, 517, 3, 701/66, 408; 340/901, 903, 425.5, 435, 426.19
See application file for complete search history.

(56) References Cited

U.S. PATENT DOCUMENTS

| | | | | |
|---|---|---|---|---|
| 5,596,332 A | * | 1/1997 | Coles et al. | 342/455 |
| 7,269,513 B2 | * | 9/2007 | Herwitz | 701/301 |
| 7,706,979 B1 | * | 4/2010 | Herwitz | 701/301 |
| 2003/0234730 A1 | * | 12/2003 | Arms et al. | 340/870.01 |
| 2007/0001051 A1 | * | 1/2007 | Rastegar et al. | 244/3.1 |

* cited by examiner

*Primary Examiner* — Gertrude Arthur Jeanglaude

(57) ABSTRACT

The invention provides six different display modes illustrating interaction and relative locations of two or more aerial vehicles (AVs), with at least one of the AVs being controllable by a ground-based or airborne-based controller of an unmanned aerial vehicle (UAV) or a pilot of a standard manned aircraft. Some display modes also indicate a predicted distance of closest approach of two AVs, the possibility of conflict or collision, and a remaining time, measured relative to the present time, before this conflict occurs. An audio and/or visual indicator advises the AV controller if this conflict event is likely to occur and recommends an acceleration or deceleration increment that may avoid such conflict.

22 Claims, 14 Drawing Sheets

AUDIOVISUAL DISPLAY MODES FOR SENSE-AND-AVOID SYSTEM FOR AERIAL VEHICLES

This application is a Continuation In Part (CIP) of U.S. Ser. No. 11/888,070, filed Jul. 31, 2007 now U.S. Pat. No. 7,706,979. This invention relates to computer screen display modes for two or more aerial vehicles ("AVs"), including an unmanned aerial vehicle ("UAVs"), using a ground-based or airborne-based sense-and-avoid display system for monitoring flight safety and navigation. The sense-and-avoid display system, hereafter referred to as the "system," provides the AV controller with an audiovisual (i.e., audio and/or visual) presentation of information pertaining to airborne conflict detection and collision avoidance. The AV controller may be a ground-based or airborne-based UAV controller or a cockpit-based pilot of a standard manned aircraft.

The novelties disclosed herein follow from the original invention in the Parent application (U.S. Pat. No. 7,269,513, issued Sep. 11, 2007) and the first Continuation in Part (CIP) (U.S. Ser. No. 11/888,070, filed Jul. 31, 2007). The essence of the inventions set forth in the Parent application and the first CIP remain essentially the same.

FIELD OF THE INVENTION

Background of the Invention

Flight safety is a key factor associated with the implementation of UAV flight operations in the National Airspace System (NAS). For flight safety, the determination and display of the flight paths of two or more aerial vehicles ("AVs") in the same three dimensional (3D) airspace requires estimating and displaying the time and distance of closest approach between two AVs, where one of the AVs may be a ground-controlled or airborne-controlled UAV. One of the challenges is displaying the computed closest approach information in a readily understandable and timely manner for UAV controllers operating under Visual Flight Rules (VFR).

When operating a manned aircraft under VFR in the NAS, visual reference to the airspace outside the cockpit is the regulation under which pilots control their aircraft's altitude and flight path. The fundamental flight safety principle of VFR is that the pilots of manned aircraft have the responsibility of maintaining safe separation from other AVs. For UAV flight operations under VFR, it is logical to assume that UAV controllers need to be equipped with a system that provides an equivalent or better level of safety compared with the visual capability of pilots in manned aircraft. The system needs to locate and track other AVs, including those AVs not equipped with an identification device (e.g., a transponder), at a sufficient range in order to detect potential airborne conflicts and maintain safe separation distances.

The critical steps for actual safe separation and collision avoidance is subdivided into two categories: (i) computations and corresponding recommendations provided by the system; and (ii) tasks performed by a UAV controller. The UAV controller is equivalent to an operator or pilot responsible for changing the flight vector and flight speed of the UAV for the purpose of collision avoidance and the maintenance of safe separation distances from other AVs.

The preceding patent applications have disclosed some approaches for analyzing situations involving two or more aerial vehicles that are airborne in the vicinity of each other, for navigation and flight safety purposes. It would be useful to provide screen displays that more directly illustrate the present situation and a prediction of at least one scenario (e.g., a speculative "worst case analysis") that may develop, if the present situation continues. Preferably, a UAV controller or AV pilot or other observer should be given a choice among two or more available audiovisual display modes that can be rapidly switched between, depending upon the observer's preference and upon the situation parameters. Preferably, a display mode should provide graphic data substantially in real time, with an associated latency no greater than a time interval between two consecutive computer screen refreshes at rates chosen by the UAV controller or AV pilot (as quickly as 2 seconds in one approach).

What is needed is a sense-and-avoid display system that provides the UAV controller or AV pilot with a graphic display of air traffic activity of a selected AV and its relation to one or more adjacent AVs. The system needs to highlight potential airborne conflict, including but not limited to collisions and provision of user-defined warning zones involving the UAV, and provide recommendations for maintaining a safe separation distance between the UAV and other AVs in real time or near-real time.

SUMMARY OF THE INVENTION

These needs are met by the invention, which provides several different display modes for present locations and predicted future locations, for each of two or more airborne aerial vehicles AV1 and AV2 that operate in the same region. These needs are met by showing potential conflicts between the two AVs where at least one of the AVs is a UAV. At least one of the AVs (e.g., the first AV) should be a controllable UAV. Because of the two dimensional nature of a graphic display screen, each of the display modes has associated strengths and deficits that may be compensated in another display mode.

In a first display mode, the present location of each of two or more AVs is projected onto, and displayed on: (1) a first, vertically oriented display plane MEW), which is defined by a local z-axis direction (vertical) and by an local x-axis, orthogonal to the z-axis, extending in an east-west direction; and (2) a second, vertically oriented display plane Π(NS), which is defined by a local z-axis direction and by a local y-axis, orthogonal to the z-axis and to the x-axis, extending in a north-south direction. Each of the planes; Π(EW) and Π(NS), serves as a display plane Π(1), or these two planes can serve as a combined display plane. The planes Π(EW) and Π(NS) intersect, and the first AV present location vector, $r10=r1(t0)$, lies on a line segment of intersection of Π(EW) and Π(NS), where $t0$ is the present time. The two planes Π(EW) and Π(NS) are preferably viewed in a perspective view, in this first display mode. A present location, $r20=r2(t0)$, of a second AV is projected, parallel to the x-axis and parallel to the y-axis onto the respective planes Π(EW) and Π(NS), using a formalism developed in Appendix A, or an equivalent formalism. The projections of the location r20 on the planes Π(EW) and Π(NS) will vary with the changing location of the second AV relative to the location of the first AV.

Each of the display screens in each of the display modes (1-6) optionally includes a supplemental first scale S1 that graphically provides (1) a visually perceptible first length L1 that is linearly proportional to a present separation distance $|r10-r20|$ of the first and second AVs and optionally provides a supplemental second scale S2 that graphically provides a second length L2 that is linearly proportional to a closing rate value, $CRV=(\partial/\partial t)|r1(t)-r2(t)|$ at a chosen value of time t, such as the present time, $t=t0$, and indicates with two opposed arrows whether the CRV>0 (arrows point away from each other) or the CRV<0 (arrows point toward each other, indicating AVs approach each other).

In a second display mode, a third, vertically oriented display plane $\Pi(\phi; 1,2)$ is defined by a local z-axis direction and by an local azimuthal axis, orthogonal to the z-axis and oriented at an azimuthal angle $\phi$ relative to the local x-axis. An anchor point for the display plane $\Pi(2)=\Pi(\phi; 1,2)$ and the azimuthal angle $\phi$ are chosen so that this azimuthal plane passes through the present locations, r1(t0) and r2(t0), of each of AV1 and AV2. The plane $\Pi(\phi; 1,2)$, is uniquely defined unless the present locations, r1(t0) and r2(t0), coincide. Where N AVs are present, numbered n=1, 2, ..., N (N≧3), an azimuthal plane $\Pi(\phi; n1,n2)$ can be determined and displayed separately for each two AVs of interest, for example, two AVs (n=n1 and n=n2) that presently have the smallest separation distance |r10−r20|, where, at least, one of the AVs is a UAV. Optionally, a plane $\Pi(\phi; n1,n2)$ can be displayed for two AVs (n=n1 and n=n2), containing the locations (vectors) rn1(t) and rn2(t), for which |rn10−rn20| is the smallest for the present time t.

A third display mode provides a nadir (overhead) view of the first and second AVs. The anchor point for this horizontal display plane $\Pi(3)$ preferably passes through the present location of the first AV (z=z1), or through the present location of the second AV (z=2), or through a vertical location intermediate between the first and second AVs (z=f·z1+(1−f)·z2, with 0<f<1; for example, f=0.5). The locations of the first and second AVs are projected vertically onto $\Pi(3)$, and each projection has an associated arrow of length L3 proportional to the closing rate value CRV=($\partial/\partial t$)|r1(t)−r2(t)|, where the two arrows point toward each other if CRV<0 and point away from each other if CRV>0. Optionally, a supplemental scale of length L3', located adjacent to a boundary of the display plane $\Pi(3)$, indicates vertical separation $\Delta z=|z1-z2|$ of the first and second AVs.

In a fourth display mode, an initial separation vector $\Delta r12(t0)=r1(t0)-r2(t0)$ and a separation distance squared, $d(t; 1,2)^2=|\Delta r12(t)|^2$ are determined for first and second AVs, using observed or estimated vector values for the present location rj(t0) (j=1, 2), the present velocity vector vj0=vj(t0) and the present acceleration vector aj0=aj(t0) for each AV. A prediction of a future separation vector is estimated, using r10−r20, v10−v20, and a10−a20, and an analysis disclosed in a preceding patent application, U.S. Ser. No. 11/888,070 (incorporated by reference herein), and one or more times, t=t(min), are determined for which $d(t; 1,2)^2=|\Delta r12(t)|^2$ is minimized. One or three real solutions, t=t(min) can be found, and interest centers on a first real solution for which t(min)≧t0.

A unit length normal n(4)=(v10^a10)/|v10^a10| is determined, and a display plane $\Pi(4)$ is identified, with normal vector n(4) and anchor point given by the location r10. Where the vectors v10 and a10 are substantially parallel, a vertically oriented plane $\Pi'(4)$, generated by the vectors k and v10, becomes the replaces the plane $\Pi(4)$, with corresponding normal vector n'(4)={k^v10}/|k^v10|. The location r20 of the second AV is shown relative to the display plane $\Pi(4)$. A predicted AV trajectory r1(t) (t0(fixed)≦t≦t(min)) for the first AV lies in, and does not deviate from, the display plane $\Pi(4)$, and intermediate locations r1(t') for the first AV trajectory are shown on the display plane $\Pi(4)$. The system optionally indicates the value d(t=t(min); 1,2) and determines whether this minimum separation distance satisfies d(t=t(min); 1,2)≦r(thr0), where r(thr0) is a selected conflict radius of a sphere Sph(4), centered at the location r1(t), and the separation vector $\Delta r12(t)$ should avoid the sphere interior. The interior may be a region where a collision of AV1 and AV2 may occur, or where these two AVs may experience a near miss, for example, r(thr0)=100−1320 feet.

Where d(t=t(min); 1,2)>r(thr0), the separation distance d(t; 1,2) for the predicted trajectories of AVs number 1 and 2 will always be greater than r(thr0). In this situation, no further graphics are required for the fourth display mode. Where d(t(min); 1,2)≦r(thr0), the system (1) estimates a first time, t=t1, that satisfies t0≦t1≦t(min) and d(t=t1; 1,2)=r(thr0), (2) determines a location r1(t1), (3) displays a circle Cir(4) in the display plane $\Pi(4)$, centered at r1(t1), of radius r(thr0) (representing a predicted conflict sphere), (4) determines a remaining time, $\Delta t(rem)=t1-t0$, before conflict will occur, and (5) provides a visually perceptible and/or audibly perceptible signal indicating that a conflict will occur and the remaining time $\Delta t(rem)$. This situation is illustrated in FIG. 4. Optionally, the system recommends an acceleration increment, $\Delta a1(t0)$ that AV1 should execute in order to avoid the predicted conflict.

In a fifth display mode, a display plane $\Pi(5)$ is defined by the present velocity vectors, v10 and v20, of the first and second AVs, with a unit length normal vector n(5)={v10^v20}/|v10^v20|. The display plane $\Pi(5)$ contains the present location r10, and contains a projection of the second AV r20, parallel to the normal vector n(5), onto the plane $\Pi(5)$, determined as disclosed in Appendix A.

In a sixth display mode, the display plane $\Pi(6)$ is defined by the present vectors, v10 and a10, with a unit length normal vector n(6)={v10^a10}/|v10^a10| and containing the present location r10, Where the vectors v10 and a10 are substantially parallel, a vertically oriented plane, generated by the vectors k and v10, becomes a plane $\Pi'(6)$ that replaces the plane $\Pi(6)$, with corresponding normal vector n'(6)={k^v10}/|k^v10|. The present location r20 of the second AV is projected parallel to the normal vector n(6) onto the plane $\Pi(6)$. Trajectories, r1(t) and r2(t), are optionally shown for AV1 and AV2 at each of a sequence of two or more spaced apart times (e.g., as dotted or dashed lines), from the present time value, t=t0, to a point of closest approach, t=t(min), for the AVs, which will generally not lie on the plane $\Pi(6)$.

The novelties of this invention include a variety of audiovisual display modes driven by the need for clarity of presentation and ease of interpretation by UAV controllers or AV pilots. In the context of UAV flight operations, the human factor is recognized as a key element for evaluating a UAV controller's capability to maintain safe separation distances from other AVs at a level of safety equivalent to or better than the cockpit-based eyes of pilots in manned aircraft. The audiovisual display modes of the system enable the UAV controller to clearly understand potential airborne conflicts during UAV flight operations, including flights that extend beyond the visual range of ground-based observers and airborne observers in chase planes.

DESCRIPTION OF BEST MODES OF THE INVENTION

Figure 11:
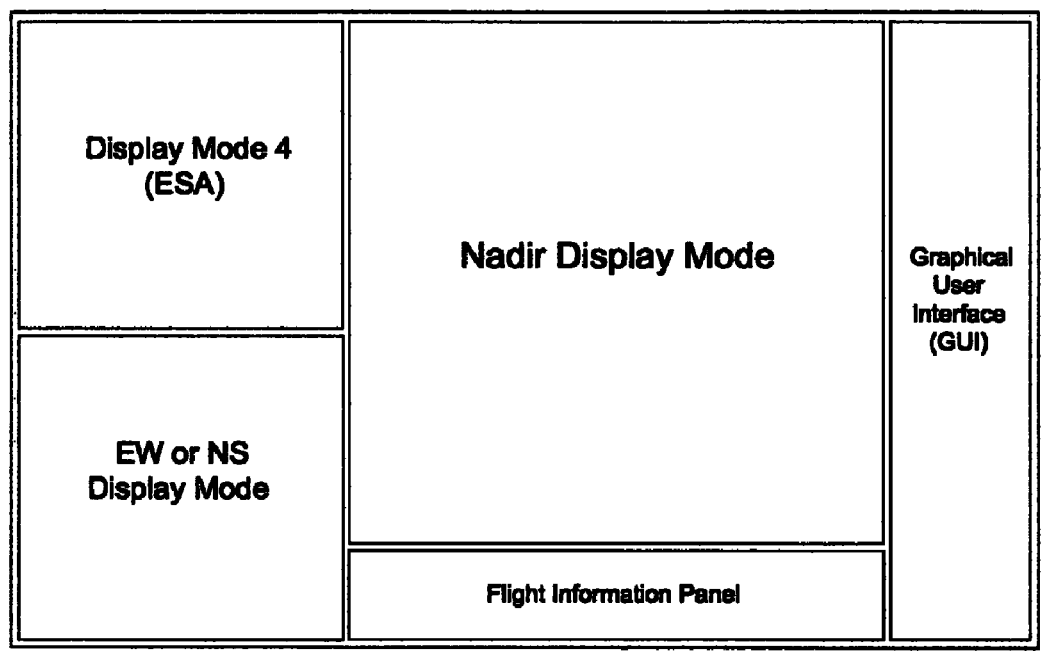
FIGS. 11 and 12 and 13 illustrate alternative screen displays, including a primary mode and one or more secondary modes, according to the invention.
Figure 12:
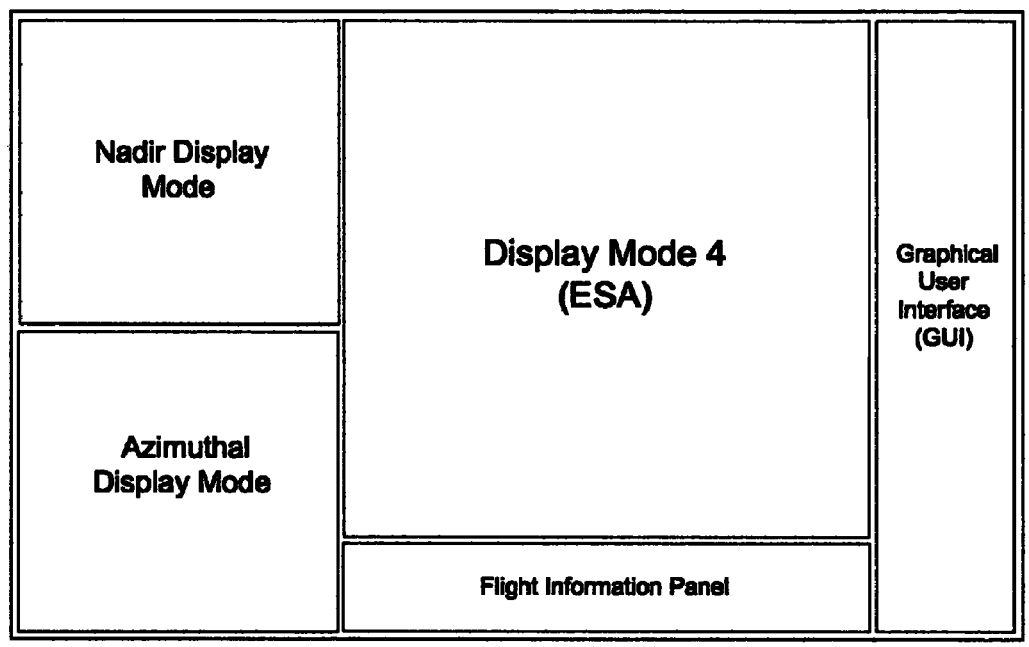
Figure 13:
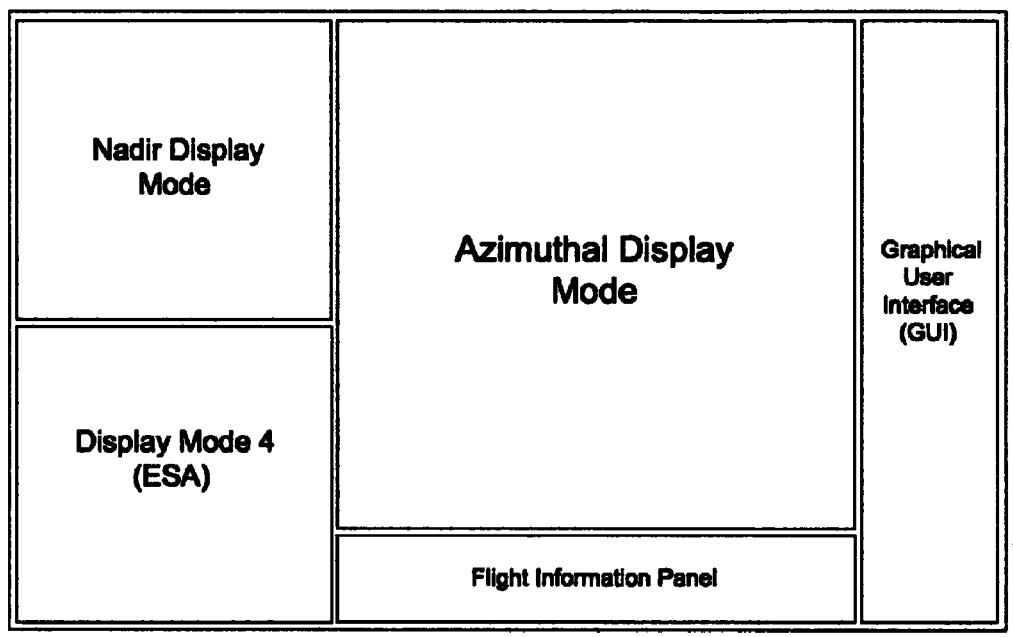

The invention provides several different screen display modes for a ground-based or airborne controller (collectively referred to as a "controller") of an aerial vehicle (AV). Two or more (or all) modes can be displayed simultaneously, or the controller can switch from one display mode to another depending upon the circumstances and upon which mode(s) are more relevant, as illustrated in FIGS. 11 and 12 and 13. Each of the Figures has an associated Cartesian coordinate system (x,y,z), with corresponding unit length vectors (i, j, k), in which the z-axis corresponds to a local vertical direction. Each of the following display modes displays a portion of one or more display planes, as this plane would appear on a screen observed by a controller. The x-axis and y-axes define a locally horizontal plane, and are orthogonal to each other and to the z-axis.

Figure 1:
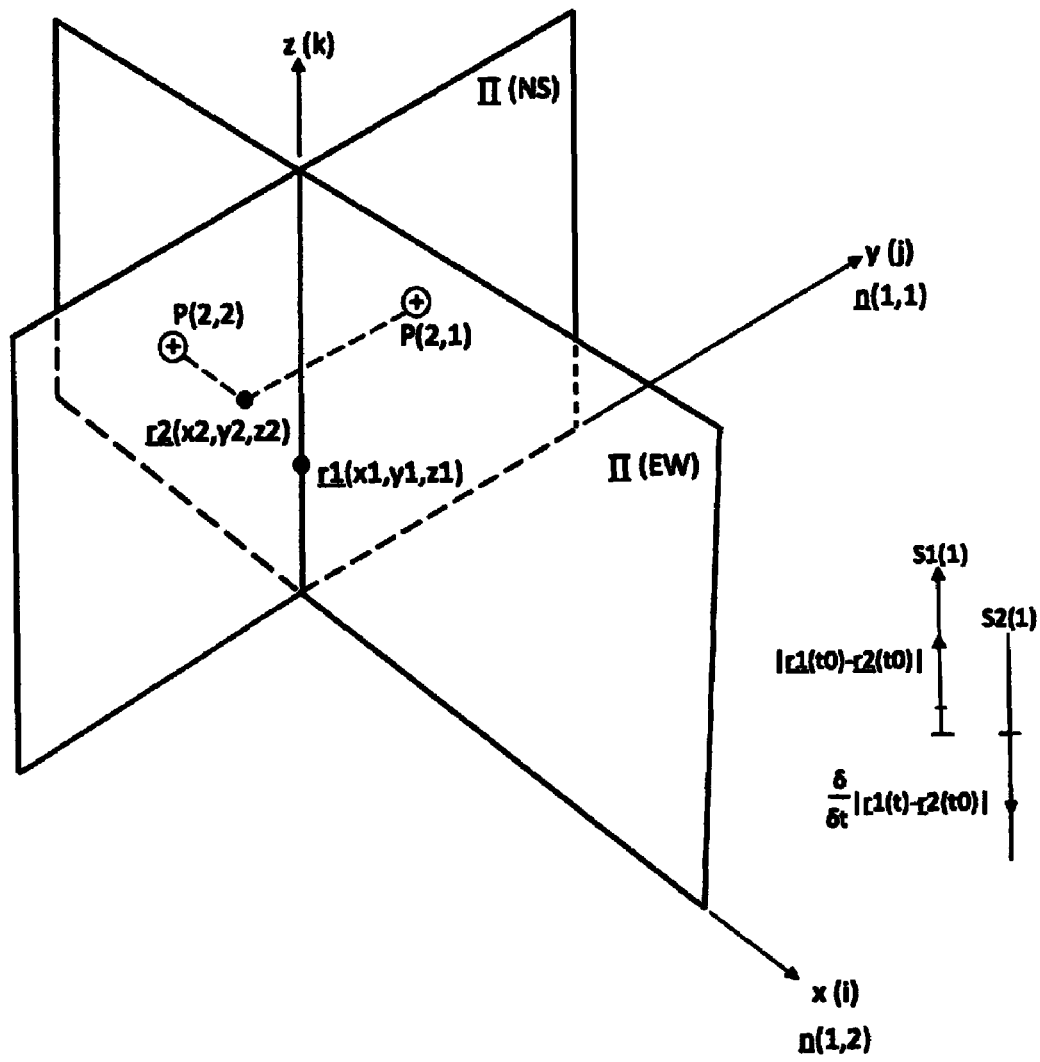
FIGS. 1 and 2 illustrate orientation of the planes $\Pi(EW)$ and $\Pi(NS)$ and $\Pi(\phi)$, for the first and second display modes.

In a first display mode, illustrated in FIG. 1, the present location of each of two or more AVs is projected onto, and displayed on, (1) a first, vertically oriented display plane Π(EW), which is defined by a local z-axis (vertical) direction and by an local x-axis, orthogonal to the z-axis and extending in an east-west direction; and/or (2) a second, vertically oriented display plane Π(NS), which is defined by the local z-axis direction and by a local y-axis, orthogonal to the z-axis and extending in a north-south direction. The planes Π(EW) and Π(NS) intersect at right angles, and the first AV present location r10=r1(t0) is on a line segment of intersection of these planes, corresponding to the altitude, z=z10, of the present location of the first AV. The second AV present location r20=r2(t0) will usually be located at a point off one or both of the planes, Π(EW) and Π(NS). Preferably, these two planes are viewed together in a perspective view, relative to the respective planes Π(EW) and Π(NS), as illustrated in FIG. 1. The present location r20 of the second AV is projected, parallel to the y-axis and parallel to the x-axis onto the planes Π(EW) and Π(NS), respectively, using a formalism developed in Appendix A The projections of the present location r20 of the second AV on the planes Π(EW) and Π(NS) will vary with the changing location r20 of the second AV relative to the location r10 of the first AV.

The vertically oriented plane Π(EW) is a plane parallel to the x-axis and parallel to the z-axis and is defined by a coordinate relation $$y = y10 \text{(constant)}, \quad (1A)$$

with a corresponding unit length normal vector $$n = j. \quad (1B)$$

The vertically oriented plane MNS), parallel to the y-axis and to the z-axis, is similarly defined by a coordinate relation $$x = x10 \text{(constant)}. \quad (2A)$$

with a corresponding unit length normal vector $$n = i. \quad (2B)$$

$$r10 = (x10, y10, z10) \quad (3)$$

Figure 9:
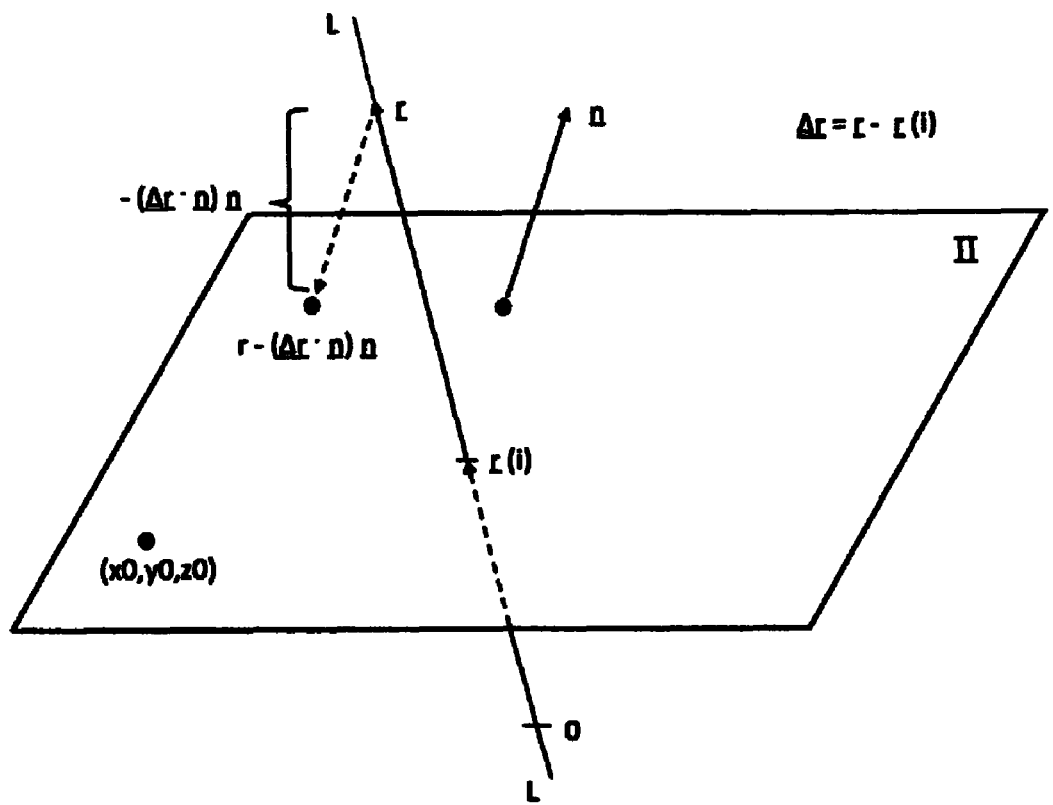

An anchor point for an intersection of the vertical planes, Π(EW) and Π(NS), has the coordinates r10=(x10,y10,z10), where z10 is the z coordinate of the first AV, and r20 is projected perpendicular onto each of the planes Π(EW) and Π(NS), as illustrated in FIGS. 1 and 9. The planes Π(EW) and Π(NS) can be used individually as display planes, with one or both of the present locations r10 and/or r20 being projected onto the display plane, computed as follows:

$$r(\text{proj}) = r - \{(r - r(i)) \cdot n\}n. \ (r = r10 \text{ or } r20). \quad (4)$$

where r(i) is a vector, partly coinciding with the vector r, that points to the intersection of R with a display plane that is defined by n.

Preferably, the planes Π(EW) and Π(NS) are shown together at a non-horizontal, perspective viewing direction, as illustrated in FIG. 1, with the present location r10 being on an intersection line of Π(EW) and Π(NS), and the location r20 being projected perpendicularly onto Π(EW) and onto Π(NS), as shown in FIG. 1.

Figure 2:
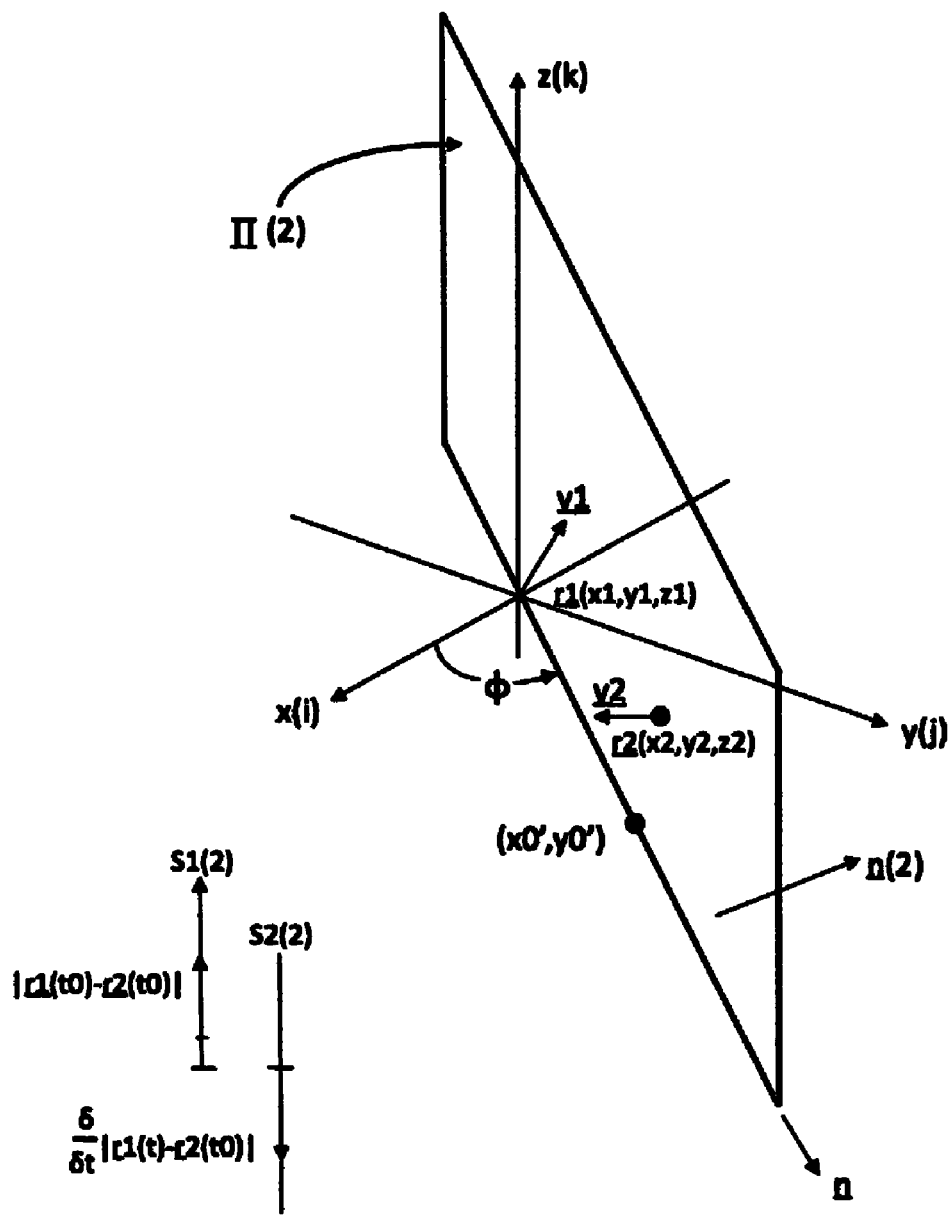

In a second display mode, a third, vertically oriented display plane Π(2)=Π(φ; 1,2), illustrated in FIG. 2, is defined by a local z-axis direction and by an local azimuthal axis, orthogonal to the z-axis and oriented at an azimuthal angle φ relative to the local x-axis, as illustrated in FIG. 2 An anchor point for the display plane Π2=Π(φ; 1,2) and the azimuthal angle φ are chosen so that this plane passes through the present locations, r10 and r20, of both AV1 and AV2. The plane Π(φ; 1,2), is uniquely defined unless the present locations, r1(t0) and r2(t0), coincide with each other or with the z-axis.

Optionally, first and second arrows extend from the present first and second AV locations, r10 and r20, where the two arrows (1) point toward each other when a closing rate value CRV=(∂/∂t)|r1(t)−r2|<0, and (2) the two arrows point away from each other when a closing rate value CRV=(∂/∂t)|r1(t)−r2(t)|>0. A single arrow, rather than two such arrows, can be used here. Where N AVs are present, numbered n=1, 2, ..., N (N≧3), the plane Π(φ; n1,n2) can be determined and displayed separately for each two AVs (n1 and n2) of interest. Optionally, a plane Π(φ; n1,n2) can be displayed for two AVs containing the locations rn1(t0) and rn2(t0), for which |rn1(t0)−rn2(t0)| is the smallest for the present time, t=t0.

The vertically oriented plane Π(φ); 1,2) of the second mode, illustrated in FIG. 2, is defined by a relation $$(x-x0')\sin\phi - (y-y0')\cos\phi = 0, \quad (5A)$$

with corresponding unit length normal vector $$n = -i \sin\phi + j \cos\phi, \quad (5B)$$

where φ is the selected azimuthal angle (0≦φ<2π) and an anchor point, (x=x0',y=y0', z=z0'), is unspecified. An anchor point for the plane 1144; 1,2), is a location (x0',y0',z0') in three dimensions through which the plane Π(φ; 1,2) passes, A (three dimensional) anchor point and an azimuthal angle φ for the plane Π(φ) are chosen so that this plane Π(φ; 1,2) includes each of the AV present locations r10=(x10,y10,z10) and r20=(x20,y20,z20). This requires that $$\tan\phi = (y20-y10)/(x20-x10)(x20-x10\neq 0), \quad (6)$$

$$(x10-x0')\sin\phi - (y1-y0')\cos\phi = 0, \quad (7A)$$

$$(x2-x0')\sin\phi - (y2-y0')\cos\phi = 0, \quad (7B)$$

and is satisfied, for example, by the choice $$(x0',y0') = ((x10+x20)/2, (y10+y20)/2). \quad (8)$$

In this display mode, the distance |r10−r20|, measured in the plane Π(φ), is precisely the present separation distance for the first and second AVs.

Optionally, the present velocity vectors v10=(vx10,vy10,vz10) and v20=(vx20,vy20,vz20) can be shown "anchored"

at the respective locations, r10 and r20. Generally, these present velocity vectors will not lie in the plane Π(φ) unless vy1/vx1=tan φ and/or vy2/vx2=tan φ.

Figure 3A:
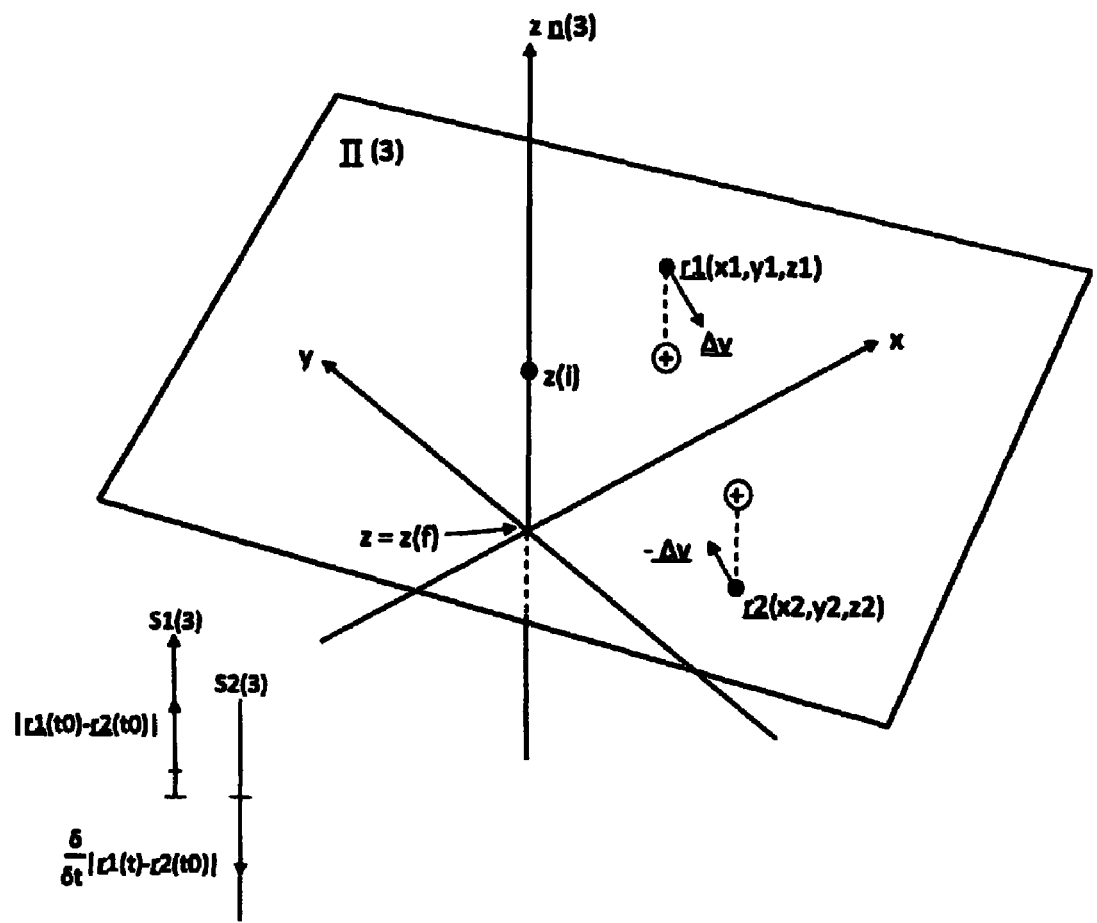
FIG. 3 illustrates a nadir view presented in a third display mode.
Figure 3B:
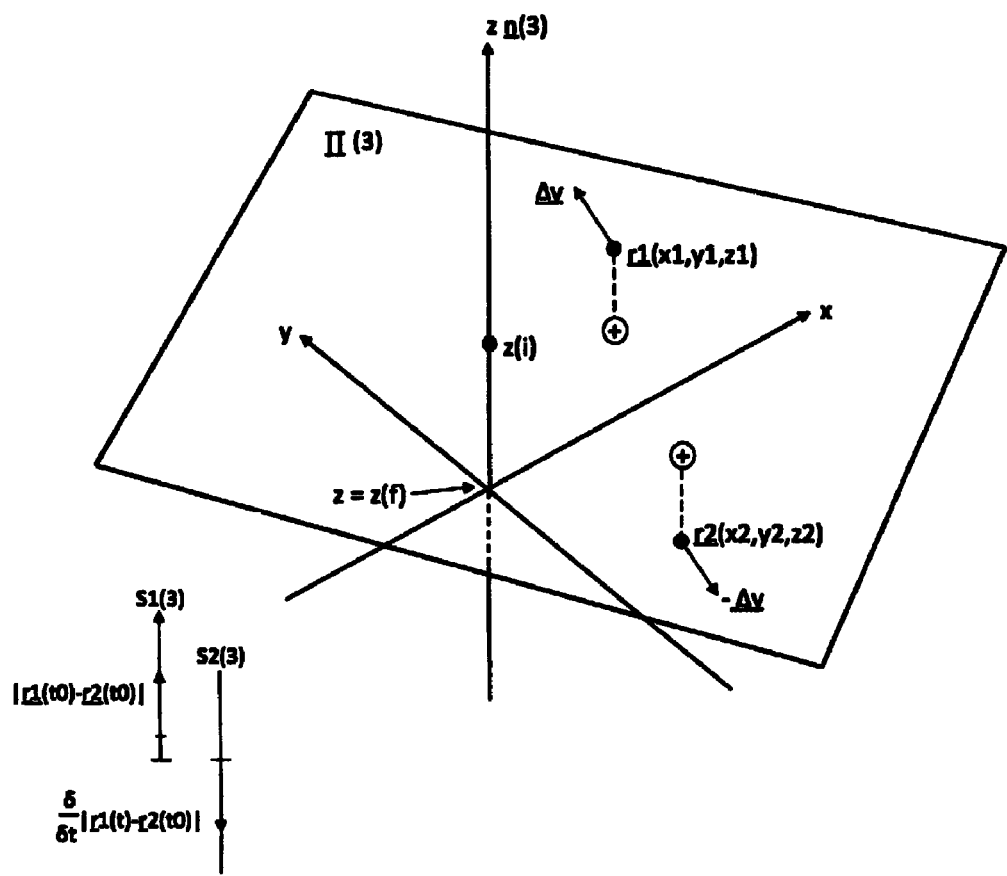

A third display mode, illustrated in FIG. 3, provides a nadir (overhead) view of the first and second AVs. The anchor point for this horizontal display plane Π(3), with unit length normal vector n=k, preferably passes through the present location r10 of the first AV (z=z10), or through the present location r20 of the second AV (z=z20), or through a location intermediate between the present vertical heights of the first and second AVs (z=z120=f·z10+(1−f)·z20, with 0≦f≦1 (for example, f=0.5). The present locations, r10 and r20, of the first and second AVs are projected vertically onto the plane Π(3), using Eq. (3) with n=k, with arrows that point that toward each other if CRV<0 and that point away from each other if CRV>0. This is preferably shown in a perspective view.

In a fourth display mode, an initial separation vector $\Delta r12(t0)=r1(t0)-r2(t0)$ and a separation distance squared, $d(t; 1,2)^2=|\Delta r12(t)|^2$ are determined for first and second AVs, using observed or estimated vector values for the present location rj(t0) (j=1, 2), the present velocity vector vj0=vj(t0) and the present acceleration vector aj0=aj(t0) for each AV. A prediction of a future separation vector is estimated, using r10−r20, v10−v20, and a10−a20, and an analysis disclosed in a preceding patent application, U.S. Ser. No. 11/888,070 (incorporated by reference herein), and one or more times, t=t(min), are determined for which $d(t; 1,2)^2=|\Delta r12(t)|^2$ is minimized. One or three real solutions, t=t(min) can be found, and interest centers on a first real solution for which t(min)≧t0.

Figure 4:
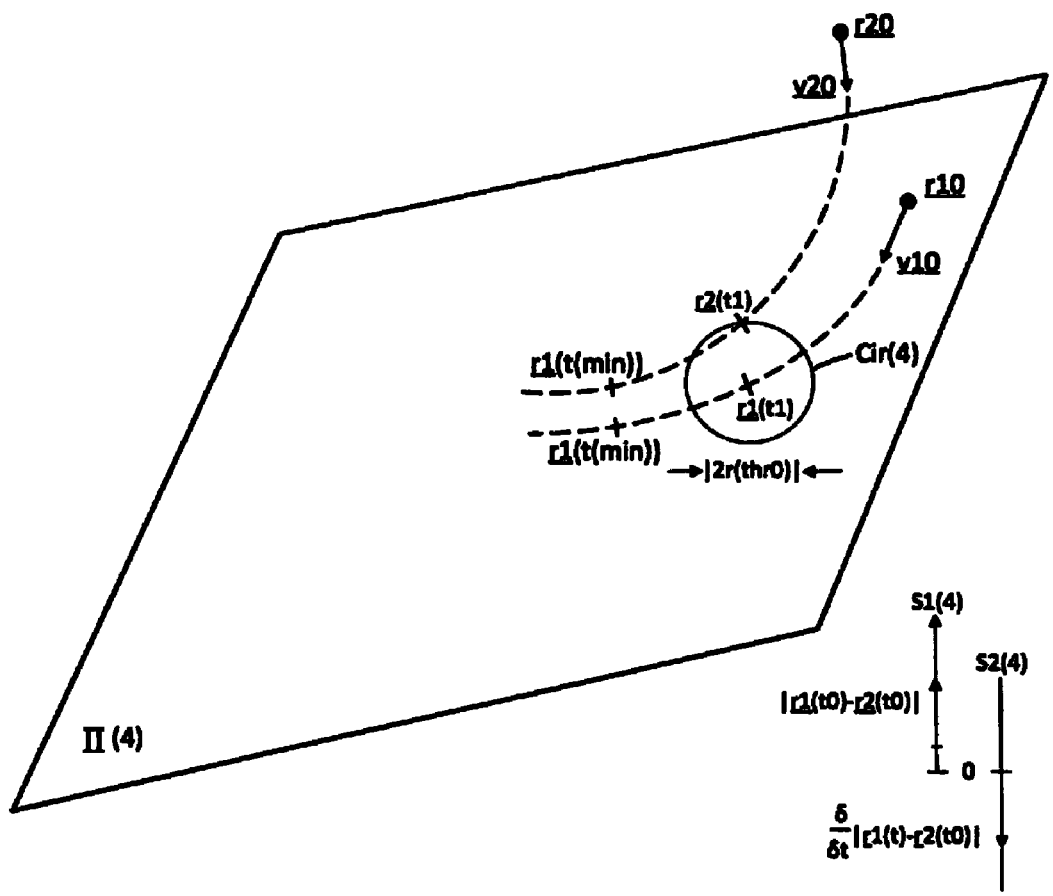
FIG. 4 illustrates a minimum separation display determined in a fourth display mode.

A unit length normal $n(4)=(v10\char`^a10)/|v10\char`^a10|$ is determined, and a display plane Π(4) is identified, with normal vector n(4) and anchor point given by the location r10. Where the vectors v10 and a10 are substantially parallel, a vertically oriented plane Π'(4), generated by the vectors k and v10, becomes the replaces the plane Π(4), with corresponding normal vector $n'(4)=\{k\char`^v10\}/|k\char`^v10|$. The location r20 of the second AV is shown relative to the display plane Π(4), or is projected onto Π(4), using the projection formalism disclosed in Appendix A or an equivalent formalism. A predicted AV trajectory r1(t)(t0(fixed)≦t≦t(min)) for the first AV lies in, and does not deviate from, the display plane Π(4), and one or more intermediate locations r1(t') for the first AV trajectory are shown on the display plane Π(4). The system optionally indicates the minimum separation distance d(t=t(min); 1,2) and determines whether this minimum separation distance satisfies d(t=t(min); 1,2)≦r(thr0). Here, r(thr0) is a selected conflict radius of a sphere Sph(4), centered at the location r1(t), and the separation vector $\Delta r12(t)$ should avoid the sphere interior. The interior of Sph(4) may be a region where a collision of AV1 and AV2 may occur, or where these two AVs may experience a near miss, for example, r(thr0)=100–1320 feet.

Where d(t=t(min); 1,2)>r(thr0), the separation distance d(t, 1,2) for the predicted trajectories of AVs number 1 and 2 will always be greater than r(thr0). In this situation, no further graphics are required for the fourth display mode. Where d(t(min); 1,2)≦r(thr0), the system (1) estimates a first time, t=t1, that satisfies t0≦t1≦t(min) and d(t=t1; 1,2)=r(thr0), (2) determines a location r1(t1), (3) displays a circle Cir(4) in the display plane Π(4), centered at r1(t1), of radius r(thr0) (representing a predicted conflict sphere), (4) determines a remaining time, Δt(rem)=t1−t0, before conflict will occur, and (5) provides a visually perceptible and/or audibly perceptible signal indicating that a conflict will occur and the remaining time Δt(rem). This situation is illustrated in FIG. 4.

Optionally, the system recommends an acceleration increment, Δa1(t0) that AV1 should execute in order to avoid the predicted conflict.

In the fourth display mode, a predicted separation vector $\Delta r12(t; 1,2)$ is determined by the relation $$\Delta r12(t)=r10-r20+\{v10-v20\}(t-t0)+(1/2)\{a10-a20\}(t-t0)^2 (t\geq t0), \quad (9A)$$

$$rj0=rj(t0)(j=1,2), \quad (9B)$$

$$vj0=vj(t0)(j=1,2), \quad (9C)$$

$$aj0=aj(t0)(j=1,2). \quad (9D)$$

This minimum value is a real solution, t=t(min), of a cubic equation $$(\partial/\partial t)d(t; 1; 2)^2=2(r10-r20)\cdot(v10-v20)+2\{\{v10-v20\}^2+2\{r10-r20\}\cdot\{a10-a20\}\}(t(min)-t0)+ 6\{v10-v20\}\cdot\{a10-a20\}\}(t(min)-t0)^2+4\{a10-a20\}^2(t(min)-t0)^3=0. \quad (10)$$

Eq. (10) has one or three real solutions. If no real solution, t=t(min), exists for which t(min)≧t0, the time point, t=t(min), of closest approach for the two AVs has already passed (i.e., t(min)<t0), and no subsequent action can be taken that will affect the minimum separation distance.

A sequence of two or more locations for each of the first and second AVs, r1(t) and r2(t), beginning at t=t0, is optionally displayed in this fourth mode, representing separate trajectories for each of the AVs. Assuming that t(min)>t0 in this fourth display mode, the distance squared of closest approach d(t(min); 1; 2)² will occur at some time in the future (t=t(min)>t0), and the system determines whether $$d(t(min); 1,2)\leq r(thr0), \quad (11)$$

where r(thr0) is the conflict radius. Optionally, the first conflict time, t=t1(t0≦t1≦t(min))), at which the separation distance $|\Delta r12(t)|\leq r(thr0)$, is determined by $$|\Delta r12(t=t1)|^2=(r10-r20)^2+2(r10-r20)\cdot(v10-v20)+ \{(v10-v20)^2+2\{r10-r20\}\cdot\{a10-a20\}\}(t1-t0)^2+ 2\{v10-v20\}\cdot\{a10-a20\}\}(t1-t0)^3+\{a10-a20\}^2 (t1-t0)^4=r(thr0)^2, \quad (12)$$

and the controller is made visually aware and/or audibly aware of how close in time, Δt=t1−t0, is the (first) conflict point. An acceleration increment, Δa1 or Δa2, is recommended, visually and/or audibly, for avoiding the conflict.

Figure 5A:
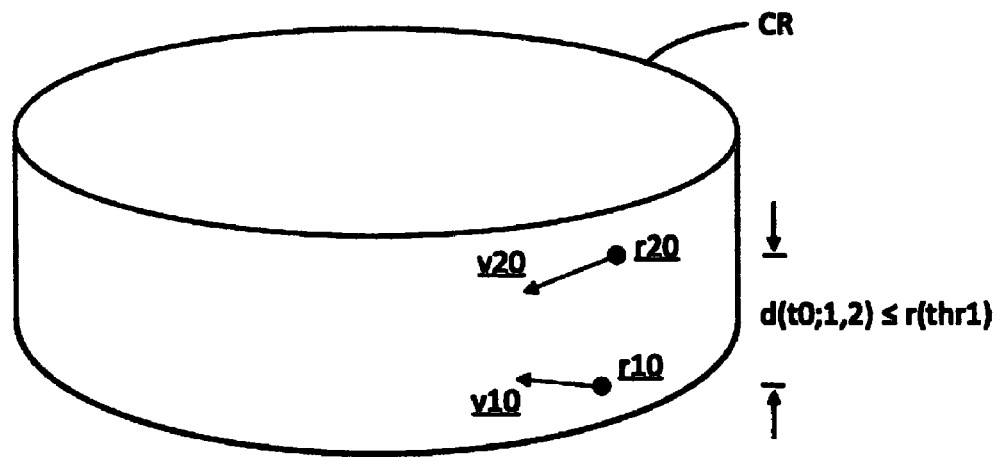
FIGS. 5A and 5B illustrate two alternatives situations in which display mode 4 can be presented.
Figure 5B:
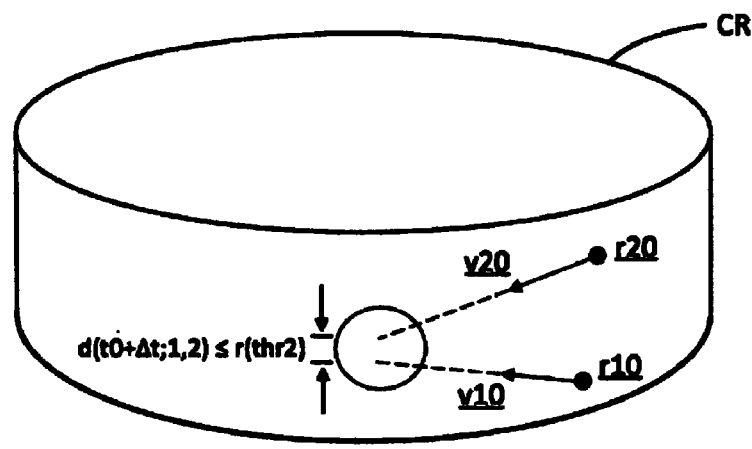

Optionally, the fourth display mode is presented whenever either of two situations occurs, illustrated in FIG. 5A and FIG. 5B, using a vertically-oriented cylinder or some other suitable geometric region representing a user-defined volume of airspace. In a first situation for the fourth display mode, illustrated in FIG. 5A, the system determines that the present separation distance $|\Delta r12(t0)|$ satisfies $$|\Delta r12(t0)|=|r10-r20|\leq r(thr1), \quad (13)$$

where r(thr1) is a first threshold radius, greater than r(thr0), for potential conflict. In this first situation, the fourth display mode is presented if the present separation distance $|\Delta r12(t0)|$ is no greater than a first selected positive potential conflict radius r(thr1)(>t(thr0)), In a second situation for the fourth display mode, illustrated in FIG. 5B, the system determines that an estimated future separation distance $|\Delta r12(t0+\Delta t; est)|$, defined by $$|\Delta r12(t0+\Delta t; est)|^2=|r10-r20+\{\Delta t(\partial/\partial t)(r1(t)-r2(t))_{t=t0}\}|^2\leq r(thr2)^2, \quad (14)$$

is no greater than a second selected positive potential conflict radius r(thr2) (>r(thr0)), where Δt is a selected positive time value (e.g., Δt=15-60 sec). In this second alternative, the fourth display mode is presented if the estimated future separation distance, for a selected future time $t=t0+\Delta t$, is no greater than r(thr2) that is greater than the conflict radius r(thr0). Optionally, in the first alternative and/or the second alternative, the locations of AVs 1 and 2 can be displayed within a chosen geometric shape, such as a cylinder CR of suitable height and diameter. Optionally, the fourth display mode can also be presented where neither the first situation nor the second situation occurs. A sphere of radius r(thr0) or r(thr1) or r(thr2) is somewhat analogous to a "tau area" in TCAS.

Figure 6:
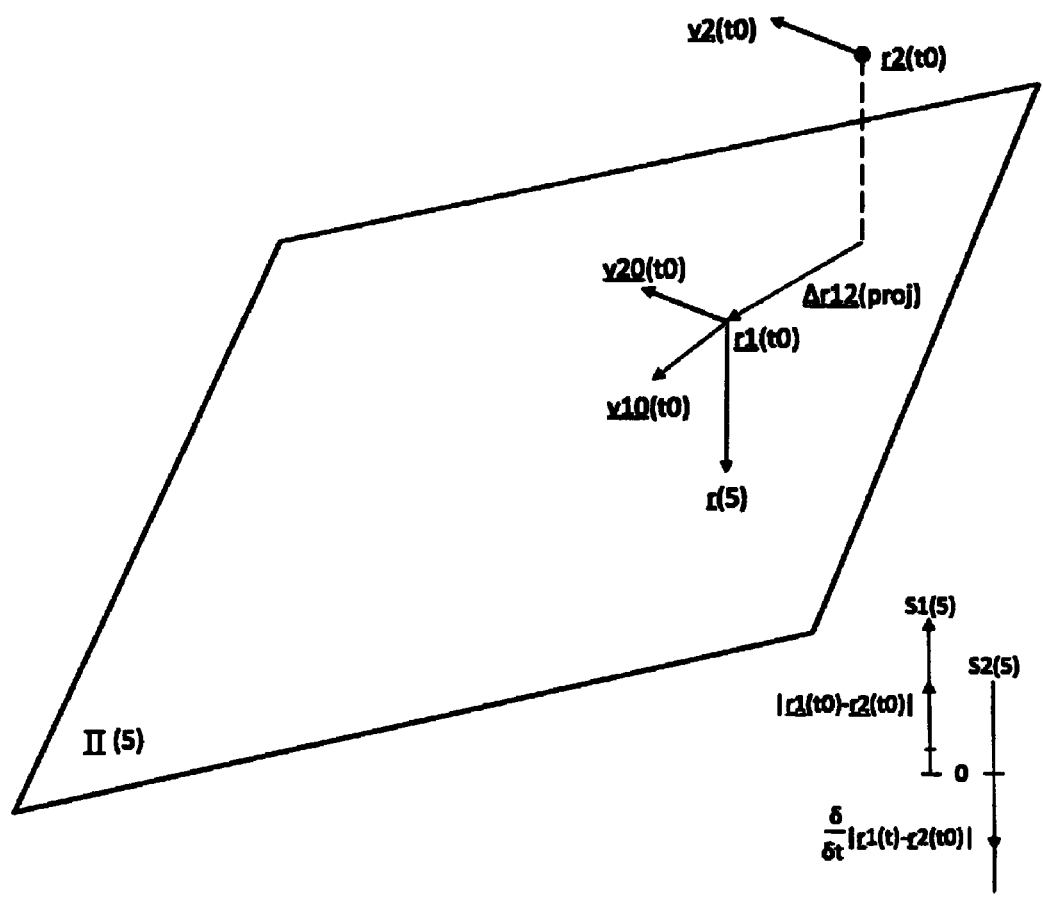
FIGS. 6 and 7 illustrate display configurations used in the fifth and sixth display modes.

In a fifth display mode, illustrated in FIG. 6, a display plane Π(5) is defined by the present velocity vectors, v10 and v20, of the first and second AVs, with unit length normal vector n(5) for this plane having the components $$n(5)=(v10\hat{\ }v20)/|v10\hat{\ }v20|. \quad (15)$$

This assumes that v10 and v20 are not substantially parallel. The display plane Π(5) contains the present location r10, and contains a projection of the second AV r20, parallel to the normal vector n(5), onto the plane Π(5), computed in Appendix A according to $$r20(proj)=r20-\{(r20-r20_I)\cdot n(5)\}n(5) \quad (16)$$

The display plane Π(5) is defined by the normal vector n(5) in Eq. (15), and an anchor point r10 that is the present location of the first AV. The second AV present location r20 is projected onto the display plane Π(5) as indicated in Eq. (16). The magnitude of the projected distance $$\Delta r12(proj)=r10-r20(proj), \quad (17)$$

measured in the plane Π(5), is an visual estimate or lower bound of the present separation distance $d(t0; 1,2)=|r10-r20|$.

As indicated in Appendix A, the unit length normal vector n(5) is expressible in terms of direction cosines, $$n(5)=(\cos \alpha 1, \cos \alpha 2, \cos \alpha 3), \quad (18)$$

$$\cos^2 \alpha 1 + \cos^2 \alpha 2 + \cos^2 \alpha^3 = 1, \quad (19)$$

the plane Π(5) may be expressed in coordinates as $$(x-x0)\cos \alpha 1 + (y-y0)\cos \alpha 2 + (z-z0)\cos \alpha 3 = 0, \quad (20)$$

where (x0, y0, z0) are the coordinates of an anchor point, for example, $$(x0,y0,z0)=r1(t0) \text{ or } r2(t0). \quad (21)$$

Figure 7:
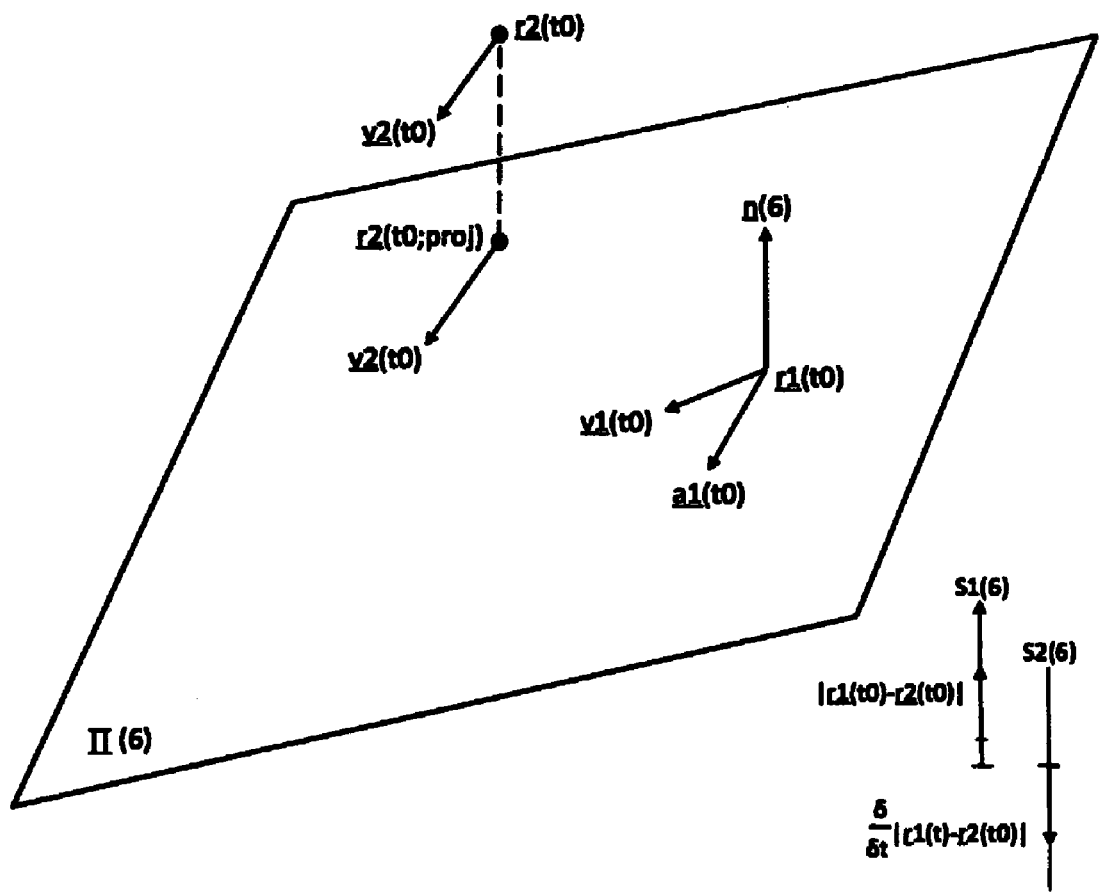

In a sixth display mode, illustrated in FIG. 7, the display plane Π(6) is defined by the present vectors, v10 and a10, with unit length normal vector $$n(6)=(v10\hat{\ }a10)/|v10\hat{\ }a10|, \quad (22)$$

and contains the present location r10, as an anchor point. This assumes that v10 and a10 are not substantially parallel. The equation for the display plane is determined as in Appendix A, Eq. (A3), using the direction cosine values determined for the normal vector n(6) and the anchor point coordinates for the present location r10:

$$r10=(x10,y10,z10)=(x0,y0,z0). \quad (23)$$

The present location r20 of the second AV is projected parallel to the normal vector n(6) onto the plane Π(6) and displayed as r2(t0; proj), as in Eq. (16). Where v10 and a10 are substantially parallel, a vertically oriented plane, generated by the vectors k and v10, becomes a plane Π'(6), replacing the plane Π(6), with corresponding normal vector $n'(6)=\{k\hat{\ }v10\}/|k\hat{\ }v10|$ Trajectories, r1(t) and r2(t) are shown for the first and second AVs from the present time value, $t=t0$, to a time, $t=t(min)$, corresponding to closest approach for the AVs, which will generally not lie on the plane Π(6).

Each of the display screens in each of the display modes (1-6) optionally includes a supplemental first scale S1 that graphically provides (1) a visually perceptible first length L1 that is linearly proportional to a present separation distance |r10-r20| of the first and second AVs and optionally provides a supplemental second scale S2 that graphically provides a second length L2 that is linearly proportional to a closing rate value, $CRV=(\partial/\partial t)|r1(t)-r2(t)|$ at a chosen value of time t, such as the present time, $t=t0$ and indicate with two opposed arrows whether the CRV>0 (arrows point away from each other) or CRV<0 (arrows point toward each other).

Each of the first, second, third, fourth, fifth and sixth display modes is referenced to a display plane, where the normal vector defining this plane is, or is proportional to, one of the vectors $$n=i, j, k, -i \, si\phi+j \cos \phi, (v10\hat{\ }v20)/|v10\hat{\ }v20|, \text{ or }$$
$$(v10\hat{\ }a10)/|v10\hat{\ }a10|, \quad (24)$$

The anchor point(s), if any, is one of the locations $$AP=r10, r20, fz10+(1-f)z20, r1(t(min)), \text{ or } r2(t(min)). \quad (25)$$

A projection r(proj) of a vector r onto a display plane having a unit length normal vector n is determined as $$r(proj)=r-\{(r-r(i))\cdot n\}n, \quad (26)$$

where r(i) is the location of an intersection of the vector r with the display plane.

The preceding development has illustrated six different display modes for two or more AVs and has considered the possibility of conflict, according to which the distance of closest approach for these AVs becomes no greater than a conflict radius r(thr0). One or more of these AVs may be an unmanned aerial vehicle that is remotely controlled by a ground-based or airborne-based UAV controller, with one or more display modes being presented to the controller at a sequence of spaced apart times (e.g., with spacing $\Delta t=2$-15 seconds, or longer). Several or all of these display modes may be presented simultaneously, or sequentially, to a remotely located controller of a UAV or to a cockpit-based pilot of a manned aircraft. In a first alternative, each of the AVs may be capable of independent flight. In a second alternative, the recommendations associated with the display modes may be transferred to an autopilot system archive.

The display modes disclosed here are preferably implemented by a computer that is programmed to receive and store: (i) the present location components, r1(t0) and r2(t0); (ii) the present velocity vector components, v1(t0) and v2(t0); (iii) the present acceleration vector components, a1(t0) and a2(t0); (iv) the conflict radius and potential conflict radii, r(thr0), r(thr1) and r(thr2); and (v) to compute other scalars and vector components as needed.

The different display modes are not intended to replace the screen views presented to an air traffic controller. The different display modes of this invention are intended to be used by any AV pilot including UAV controllers. The different display modes represent a specific AV's flight safety situation symbolically in two dimensions, with each display mode having its characteristic strengths and deficits. It is likely that a given UAV controller or AV pilot will develop a human factors driven preference for one, two or three of these modes. Therefore, each of the display modes is made available to suit the preferences of a given UAV controller or AV pilot.

Optionally, the UAV controller or AV pilot has a larger or centralized primary screen to display a chosen mode and one, two or more secondary screens to display modes that may complement information shown on the primary screen. In FIGS. 11, and 12 and 13, modes 1 and 2 and 4 are displayed as primary, respectively, and other modes are displayed as secondary, respectively. This treatment can be extended to provision of many screens, one being primary and all others being secondary. The controller presses one or more of a group of M buttons to bring up a specified display mode as primary, and may further specify one or more of the M−1 other display modes as secondary.

The information presented by the audiovisual display modes might be equated with an Air Traffic Control perspective; however, this is not the case. The fundamental difference is that the computations and algorithms of the sense-and-avoid display system focus only on potential airborne conflicts involving a selected AV (e.g., the UAV being operated by a ground-based controller). The system processes 3D data from a data source, such as ground-based radar, and then evaluates, identifies, prioritizes, and declares action for potential conflicts with other AVs in a timely manner. For UAV flights that extend beyond the visual range of ground-based observers and airborne observers in chase planes, the system provides the UAV controller with a flight safety capability of maintaining a safe separation distance from other AVs.

When compared with the forward-looking perspective of pilots in manned aircraft, the difference is that the sense-and-avoid display system is capable of providing UAV controllers with information from a 360° 3D volume of airspace surrounding their respective UAV. This capability is made possible using 3D data sources. An example of such a 3D data source is the Sentinel radar manufactured by Thales Raytheon Systems that has been integrated with the herein described sense-and-avoid display system. The Sentinel radar detects the x,y,z positions of cooperative AVs equipped with an identification device (e.g., a transponder) as well as noncooperative AVs not equipped with an identification device.

In the operational framework of flight safety, the invention described herein applies to an Unmanned Aircraft System (UAS) defined as including an Unmanned Aerial Vehicle (UAV), a ground control station, a UAV controller, and any associated equipment, software and communication links that support UAV flight operations.

APPENDIX A

Display Plane Geometry

Figure 8:
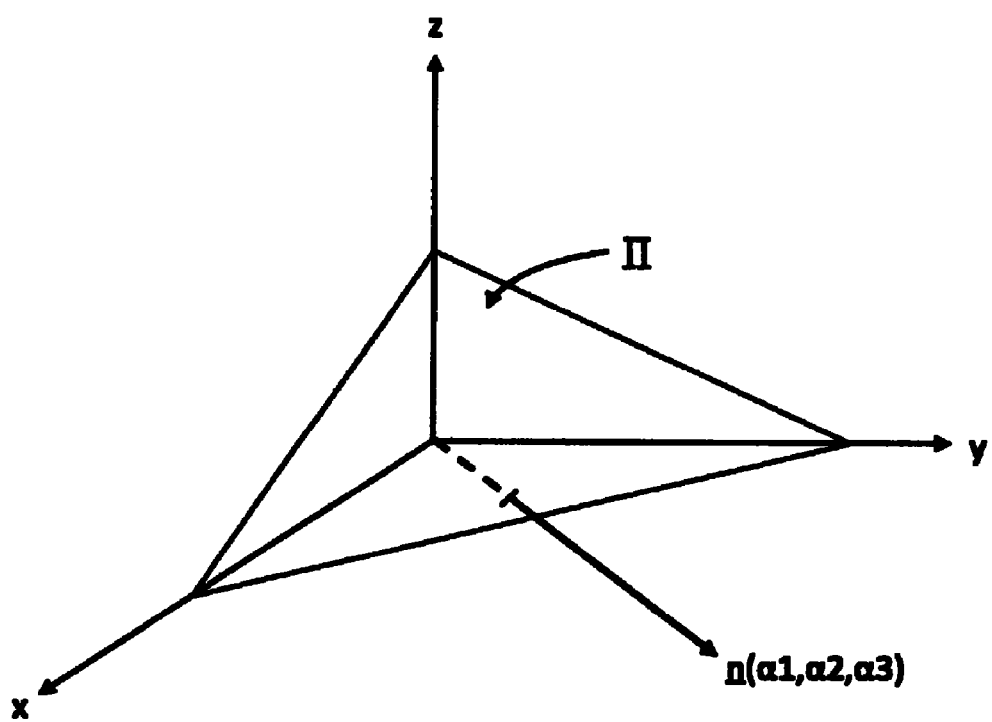
FIGS. 8 and 9 illustrate some geometric determinations used in various embodiments.

Simple analytical geometry techniques can be used to relate a unit length normal vector components of a display plane and coordinates of an anchor point on the plane to components of an equation defining that plane. If the unit length normal vector n for the plane is expressible in terms of direction cosines, $$n(5)=(\cos \alpha 1, \cos \alpha 2, \cos \alpha 3), \tag{A1}$$

$$\cos^2 \alpha 1 + \cos^2 \alpha 2 + \cos^2 \alpha 3 = 1, \tag{A2}$$

the plane Π may be expressed in coordinates as $$(x-x0)\cos \alpha 1 + (y-y0)\cos \alpha 2 + (z-z0)\cos \alpha 3 = 0, \tag{A3}$$

where (x0, y0, z0) are the coordinates of an anchor point, as illustrated in FIG. 8. In the context presented here, the anchor point usually coincides with the present location (vector) of the first or second AV:

$$(x0,y0,z0)=r1(t0) \text{ or } r2(t0). \tag{A4}$$

A projection of a vector, such as r, onto a plane that is defined by a unit length normal vector n can be expressed in vector notation as $$r(\text{proj})=r-\{(r-r(i))\cdot n\}n. \tag{A5}$$

as illustrated in FIG. 9, where r(i) is an intersect vector, drawn to the location where r intersects the plane Π. The intersect location r(i) is determined as follows. Express the vector r in parametric form as $$x-x1=e\cdot s,\ y-y1=f\cdot s,\ z-z1=g\cdot s,\ (0\leq s\leq |r|) \tag{A6}$$

$$e^2+f^2+g^2=1, \tag{A7}$$

where s=0 corresponds to the origin of r and s=|r| corresponds to the other end of the vector r, the location r. In this configuration, x1=y1=z1=0. The unit length normal vector n has components n=(a,b,c) with $a^2+b^2+c^2=1$, and a plane Π with the normal vector n can be expressed parametrically as $$a(x-x0)+b(y-y0)+c(z-z0)=0, \tag{A8}$$

where (x0, y0, z0) is an anchor point of this plane. The intersect vector r(i) corresponds to a location on the plane Π for which $$a(s_I e-x0)+b(s_I f-y0)-c(s_I g-z0)=0, \tag{A9}$$

$$s = s_1 = \{a\ x0 + b\ y0 + c\ z0\}/\{a\dot{e} + b\dot{f} + c\dot{g}\} \tag{A10}$$
$$= \{a\ x0 + b\ y0 + c\ z0\}/(\dot{n}\ \dot{r}^\wedge),$$

$$r^\wedge=r/|r|, \tag{A11}$$

$$r=r\hat{s}_I, \tag{A12}$$

where the line parameter $s_I$ may have any positive or negative or zero value. The location r(i) is the intersection with the plane Π of a line segment LL (of undetermined length), aligned with the vector r. These geometric quantities are illustrated in FIG. 9.

APPENDIX B

Determination of Acceleration Increment to Avoid Conflict

Figure 10:
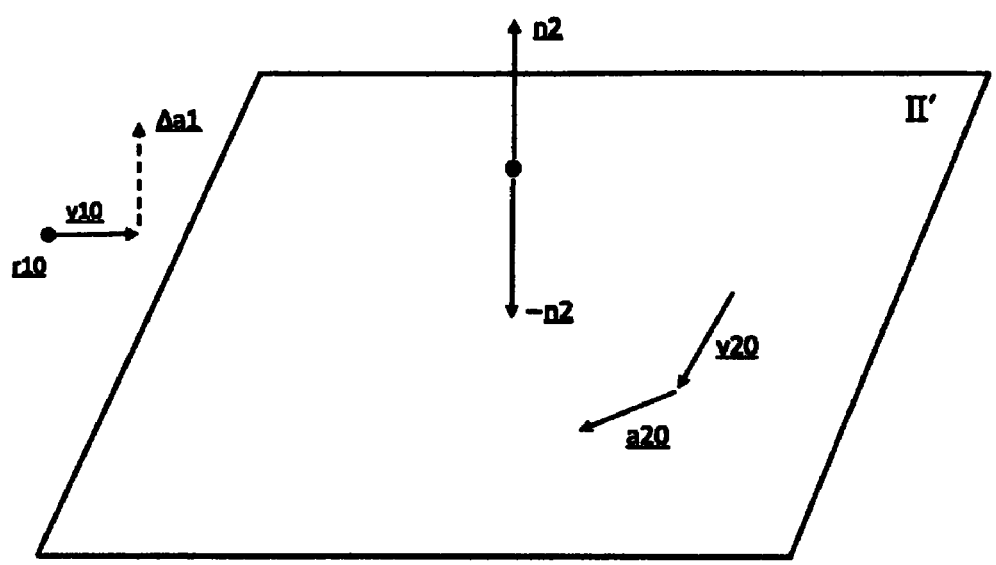
FIG. 10 illustrates a procedure for determination of an acceleration increment to avoid conflict of collision.

Assume AV2 is approaching AV1 with a velocity vector v2(t) and acceleration vector a2(t), as determined and made available to the first AV controller, where a2(t) is assumed to be substantially constant, as illustrated in FIG. 10. Assuming that v2(t) and a2(t) are not substantially parallel, the cross product, v2(t)^a2(t) characterizes a unit length normal vector $$n2=\{v2(t)\hat{\ }a2(t)\}/|v2(t)\hat{\ }a2(t)| \tag{B1}$$

that is perpendicular to an instantaneous approach plane Π' that contains v2(t) and a2(t) and has the location r2(t) as an anchor point. Note that n2 need not be entirely vertical or entirely horizontal. One optimal maneuver for AV1 is to move perpendicular to the plane Π', away from this plane. The approach plane Π' may be defined by coordinates (x,y,z) satisfying $$n2\cdot r-L=0, \tag{B2}$$

$$r=(x,y,z), \tag{B3}$$

where L is a perpendicular distance from the origin to the plane Π'. The acceleration increment Δa1 is preferably chosen to be parallel (or anti-parallel) to the normal vector n2, which is defined by the present vectors v20 and a20 of AV2. Identification of the normal n2 for the approach plane Π' with sufficient accuracy will often require use of a directional antenna with very good angular resolution, in order to accurately determine or estimate the vectors v20 and a20.

In an alternative response to potentially entering a conflict volume, AV1 can execute a substantial deceleration Δa1 in its present heading (reduced magnitude, same direction), chosen so that AV1 will reach and pass through its location r1(t1) long after AV2 has reached and passed through its corresponding location r2(t1), to ensure that the separation distance d(t; 1,2) is always greater than r(thr0). This assumes that AV2 does not significantly alter its own velocity, acceleration or deceleration vectors.

What is claimed is:

1. A method for displaying present and predicted future locations, velocities and accelerations of each of at least first and second aerial vehicles (AVs), the method comprising providing a computer that is programmed:

to receive or otherwise provide estimates of present locations rj(t0) of a selected number J of AVs, numbered j=1, ..., J (J≧2), for a present time, t=t0, where the locations rj(t0) are determined with reference to a Cartesian coordinate system (x,y,z) having unit length vectors i, j and k oriented parallel to x-, y- and z-coordinate axes, with initial vector location values rj(t0)=(xj0,yj0,zj0);

to provide estimates of at least one of present velocity vectors vj(t0) and present acceleration vectors aj(t0) for the J AVs, for the present time, t=t0;

to provide an estimate of locations rj(t), velocity vectors vj(t) and acceleration vectors aj(t) for at least two spaced apart times t that are greater than t0;

to provide an estimate of a time, t=t(min)≧t0, for which a distance separation value |r1(t)−r2(t)| attains a locally minimum value for the AVs j=1 and j=2, and estimating the locations rj(t=t(min)) for j=1 and 2;

to provide a unit length normal vector n of a display plane for the J AVs, where the vector n is determined with reference to at least one of the following vectors: i, j, k, −i sin φ+j cos φ, (v10^v20)/|v10^v20|, and (v10^a10)/|v10^a10|, where φ is a selected azimuthal angle in a range 0≦φ<2π;

to visually represent, on a display screen, a display plane Π defined by the normal vector n and passing through at least one display plane anchor point AP that is determined with reference to one or more locations AP=r10, r20, {f·z10+1−f) z20}k, r1(t=t(min)), and r2(t=t(min)), where f is a selected value in a range 0≦f≦1; and to visually represent, on the display screen, the locations r1(t0) and r2(t0) on or adjacent to a display plane Π, determined with reference to the normal vector n.

2. The method of claim 1, wherein said computer is further programmed to provide, on said display screen, a distance scale that presents a visually perceptible line segment that is linearly proportional to a separation distance |r1(t0)−r2(t0)| between said present location of said first AV and said second AV.

3. The method of claim 1, wherein said computer is further programmed to provide, on said display screen, a closing-rate scale that presents a visually perceptible line segment having a length that is linearly proportional to a time rate of change, (∂/∂t)|r1(t)−r2(t)|, of a difference of said location vectors, r1(t) and r2(t), for said first AV and said second AV for a selected value of time t, and that indicates whether the time rate of change of the difference, |r1(t)−r2(t)|, is positive, is negative or is substantially zero.

4. The method of claim 1, wherein said computer is further programmed to choose said normal vector n to be i, representing said present location vector r10 on said display plane Π, and representing said present location vector r20 adjacent to or on said display plane Π, and representing a location vector projection r20(proj) that is a projection of said present location vector r20 onto said display plane Π.

5. The method of claim 4, wherein said computer is further programmed to determine said vector r20(proj) as r20(proj)=r20−{(r20−r20(i))·n}n, where r20(i) is a location where a line segment aligned with said vector r20 intersects said display plane Π.

6. The method of claim 1, wherein said computer is further programmed to choose said normal vector n to be j, representing said present location vector r10 on said display plane Π, and representing said present location vector r20 adjacent to or on said display plane Π, and representing a location vector projection r20(proj) that is a projection of said present location vector r20 onto said display plane Π.

7. The method of claim 6, wherein said computer is further programmed to determine said vector r20(proj) as r20(proj)=r20−{(r20−r20(i))·n}n, where r20(i) is a location where a line segment aligned with said vector r20 intersects said display plane Π.

8. The method of claim 7, wherein said computer is further programmed to determine said vector projection r20(proj; 1) as r20(proj; 1)=r20−{(r20−r20(i))·n(1)}n(1), where r20(i) is a location where a line segment aligned with said vector r20 intersects said display plane Π.

9. The method of claim 7, wherein said computer is further programmed to determine said vector projection r20(proj; 2) as r20(proj; 2)=r20−{(r20−r20(i))·n(2)}n(2), where r20(i) is a location where a line segment aligned with said vector r20 intersects said display plane Π.

10. The method of claim 1, wherein said computer is further programmed:

to provide a first display plane with normal vector n(1)=i;

to provide a second display plane with normal vector n(2)=j, that intersects the first display plane in a line segment;

to represent said present location vector r10 on the line segment;

to represent said present location vector r20 on or adjacent to at least one of the first display plane and the second display plane;

to represent a first location vector projection r20(proj; 1) that is a projection of said present location vector r20 onto the first display plane; and to represent a second location vector projection r20(proj; 2) that is a projection of said present location vector r20 onto the second display plane.

11. The method of claim 1, wherein said computer is further programmed:

to choose said normal vector for said display plane as n=−i sin φ+j cos φ, where φ is an angle chosen to satisfy a relation tan φ=(y20−y10)/(x20−x10), where said present locations r10 and r20 have the respective coordinates (x10,y10,z10) and (x20,y20,z20), and x20−x10 is not substantially 0; and to choose said anchor point for said display plane so that said display plane contains said locations r10 and r20.

12. The method of claim 1, wherein said computer is further programmed:

to choose said normal vector for said display plane as n=k, and said display plane to be a substantially horizontal plane having a z coordinate that is substantially equal to f·z10+(1−f)·z20, with 0≦f≦1; and to represent at least one of said present locations r=r10 and r=r20 adjacent to or on said display plane Π, and to represent a location projection r(proj) that is a projection of said present location r onto said display plane Π, with r(proj)=r−{(r−r(i))·n}n, where r(i) is a location where a line segment, aligned with said location r, intersects said display plane Π.

13. The method of claim 1, wherein said computer is further programmed:
to choose said display plane Π to include said present location vector r10 and to include said velocity vectors v10 and v20, where v10 and v20 are not substantially parallel to each other;
to represent said present location vector r20 adjacent to or on said display plane Π; and
to represent a projection vector r20(proj) of said present location vector r20 onto said display plane Π as r20(proj)=r20−{(r20−r20(i))·n}n, where n is said normal vector for said display plane Π and r20(i) is a location where a line segment aligned with said vector r20 intersects said display plane Π.

14. The method of claim 13, wherein said computer is further programmed to choose said normal vector n to be $$n=\{v10\char`\^v20\}/|v10\char`\^v20|,$$

where v10 and v20 are not substantially parallel to each other.

15. The method of claim 1, wherein said velocity vectors v10 and v20 are approximately parallel to each other, and wherein said computer is further programmed:
to choose said display plane to include said present location vector r10 and
to include said vectors k and vj0 (j=1 or 2);
to represent said present location vector r20 adjacent to said display plane Π;
to represent a projection vector r20(proj) of said present location vector r20 onto said display plane Π as $$r20(\text{proj})=r20-\{(r20-r20(i))\cdot n\}n,$$

where n is said normal vector for said display plane Π, and r20(i) is a location where a line segment aligned with said vector r20 intersects said display lane Π.

16. The method of claim 14, wherein said computer is further programmed to chose said normal vector n to be $$n=\{vj0\char`\^k\}/|vj0\char`\^k|.$$

17. The method of claim 1, wherein said computer is further programmed:
to choose said display plane Π to include said first AV present location vector r10 and to include said first AV velocity and acceleration vectors v10 and a10, where v10 and a10 are not approximately parallel to each other;
to represent said present location vector r20 adjacent to or on said display plane Π;
to represent a projection vector r20(proj) of said present location vector r20 onto said display plane Π as $$r20(\text{proj})=r20-\{(r20-r20(i))\cdot n\}n,$$

where n is said normal vector for said display plane Π, and r20$_I$ is a location where a line segment aligned with said vector r20 intersects said display plane Π.

18. The method of claim 17, wherein said computer is further programmed to choose said normal vector n to be $$n=\{v10\char`\^a10\}/|v10\char`\^a10|.$$

19. The method of claim 1, wherein said velocity and acceleration vectors v10 and a10 are substantially parallel to each other, and wherein said computer is further programmed:
to choose said display plane to include said present location vector r10 and to include said vectors k and either v10 or a10;
to represent said present location vector r20 adjacent to or on said display plane Π; and
to represent a projection vector r20(proj) of said present location vector r20 onto said display plane Π as $$r20(\text{proj})=r20-\{(r20-r20(i))\cdot n\}n,$$

where n is said normal vector for said display plane Π, and r20(i) is a location that a line segment aligned with said vector r20 intersects with said display plane Π.

20. The method of claim 19, wherein said computer is further programmed to choose said normal vector n to be at least one of $$n=\{v10\char`\^k\}/|v10\char`\^k|$$

and $$n=\{a10\char`\^k\}/|a10\char`\^k|.$$

21. The method of claim 1, further comprising presenting, in a visually perceptible manner, at least one of a primary display mode and a secondary display mode, on a single screen where the primary display mode and the secondary display mode are distinct modes that are constructed and displayed according to claim 1.

22. The method of claim 1, further comprising presenting, in a visually perceptible manner, a primary display mode on a primary screen and at least one secondary display mode on at least one secondary screen, where the primary display mode and the secondary display mode are distinct modes that are constructed and displayed according to claim 1.

* * * * *